(12) United States Patent
Strauss

(10) Patent No.: US 6,315,805 B1
(45) Date of Patent: Nov. 13, 2001

(54) SINGLE OR MULTI-PLY FILTER MEDIUM FOR AIR FILTRATION AND A FILTER ELEMENT MADE THEREFROM

(75) Inventor: Andreas Strauss, Bad Feilnbach (DE)

(73) Assignee: FiberMark Gessner GmbH Co., Bruckmuhl (DE)

( * ) Notice: Subject to any disclaimer, the term of this patent is extended or adjusted under 35 U.S.C. 154(b) by 0 days.

(21) Appl. No.: 09/559,258

(22) Filed: Apr. 27, 2000

(30) Foreign Application Priority Data

May 6, 1999 (DE) .............................................. 199 20 983

(51) Int. Cl.[7] .................................................... B03C 3/011
(52) U.S. Cl. ................................ 55/486; 55/487; 55/522; 55/524; 95/57; 95/78; 95/287; 15/347; 15/352
(58) Field of Search ....................... 55/522, 524, DIG. 5, 55/DIG. 39, 486, 487; 96/59, 66; 210/496; 95/57, 78, 287; 15/347, 352

(56) References Cited

U.S. PATENT DOCUMENTS

| 4,631,077 | * | 12/1986 | Spicer et al. ............................ 55/522 |
| 5,230,800 | * | 7/1993 | Nelson .................................. 210/496 |
| 5,273,818 | * | 12/1993 | Kim et al. .............................. 55/522 |
| 5,350,620 | * | 9/1994 | Sundet et al. .................... 55/DIG. 39 |
| 5,389,166 | * | 2/1995 | White ..................................... 55/522 |
| 5,507,847 | * | 4/1996 | George et al. .......................... 55/522 |
| 5,525,136 | * | 6/1996 | Rosen ..................................... 55/522 |
| 5,922,096 | * | 7/1999 | Stemmer ......................... 55/DIG. 39 |
| 5,989,320 | * | 11/1999 | Rutkowski ...................... 55/DIG. 39 |
| 6,171,369 | * | 1/2001 | Schultink et al. .............. 55/DIG. 39 |
| 6,183,536 | * | 2/2001 | Schultink et al. .............. 55/DIG. 39 |

FOREIGN PATENT DOCUMENTS

| 92 18 021.3 | 9/1993 | (DE) . |
| 44 43 158 A1 | 6/1996 | (DE) . |
| 196 18 758 A1 | 11/1997 | (DE) . |
| 0 687 195 B1 | 1/1999 | (EP) . |

OTHER PUBLICATIONS

Van A. Wente, Naval Research Laboratory, Washington 25, D.C. "Superfine Thermoplastic Fibers" Industrial Enginiiring Chemistry, vol. 48, pp. 1342–1346.

* cited by examiner

Primary Examiner—David A. Simmons
Assistant Examiner—Minh-Chan T. Pham
(74) Attorney, Agent, or Firm—Nixon & Vandehye

(57) ABSTRACT

A dual- or multi-layer filter medium for air filtration, having at least one meltblown layer (2, 2a and 5) at least one meltblown layer (2 and 2a) is placed on the inlet side of the filter medium. The meltblown layer has a pore size larger than that of the next following layer or layers.

20 Claims, 2 Drawing Sheets

SINGLE OR MULTI-PLY FILTER MEDIUM FOR AIR FILTRATION AND A FILTER ELEMENT MADE THEREFROM

The invention relates to dual- or multi-ply filter media for the filtration of air, that is to say for the filtration of solids from gases, and also filter elements using such filter media, as for example star-folded cartridges, pleated panel filters, cassettes, mini-pleat cassettes, flat filters or the like.

BACKGROUND OF THE INVENTION

For purifying air both for air conditioning and ventilation purposes, for instance in buildings or vehicles and also for vehicles driven by IC engines, as for instance gas turbines or diesel and gasoline engine for motor vehicles or all types it is customary to employ air filtering media and air filters produced therefrom, which possess a certain, limited capacity to hold dust and after reaching a certain limit, which may be expressed in terms of hours of use, differential pressure or mileage, must be replaced. The dust holding capacity is consequently measured in accordance with the maximum amount of dust, which the air filter is able to accept before a lower limit for a certain quantity of air passing through it, and consequently the end of its service life, is reached.

As a rule in the case of such applications the necessary level of the degree of separation is known or set, for example in terms of the filter class in air conditioning and ventilating technology or of a predetermined percentage of the particles to be separated dependent on the requirement and the test method for the respective internal combustion engine (for example the degrees of fractions separated or gravimetric degree of separation). Testing is performed in accordance with the method using a test aerosol (normally test dust, for example SAE fine or SAE coarse) under exactly set conditions such as impact flow speed, raw gas concentration, time and duration of the measurement, criterion for termination of measurement or the like. The degree of separation accordingly indicates what percentage of the dust is retained in the filter, and is substantially dependent of the pore size of the air filter.

The aim is to achieve maximum dust storage capacity and accordingly service life under these conditions. Since however the degree of separation on the one hand and the service life on the other hand correlate negatively with each other, it is only possible to achieve an increase in service life in the case of single homogenous ply media at the expense of the degree of separation, unless the installed filter is simply increased in size. This is not alone limited by increases in costs, but more especially also by limited space for installation so that for instance in the case of a pleated panel filter the number of the folds can not be increased to the necessary degree.

As a remedy the pleats in the impregnated paper in panel filters are presently covered on the inlet side with a foam material ply, which is to retain a fraction of the dust or at least reduce the kinetic energy of the particles so that there will be an increase in the service life. This method does however involve substantial disadvantages as regards production technology, since the layer of foam material must be bonded to the pleated panel after production of the panel in a further processing stage, for example using beads of hotmelt adhesive.

For internal combustion engines gradient filters are also employed, which are produced from synthetic fiber and become increasingly denser in the direction of flow through the filter. In this case the coarse particles are separated at the surface and the fines are deposited deeper in the filter. A disadvantage here is that for a given amount of installation space substantially fewer folds can be incorporated. This however increases the impact or inlet flow velocity with all the disadvantages connected therewith: higher pressure losses in the filter inherently owing to the higher flow velocity and deposit of the required dust quantity on less filter area so that the specific dust storage capacity must in this case be many times higher. Additionally such filter media make necessary a complete change in present day production systems, because sealing off the ends of the folds is no longer possible using conventional hotmelt technology. In fact, the bellow-like folds are injected directly in an injection molding method in a plastic frame in the case of such media, something which is comparatively involved.

Further present day methods for increasing the service life, for example for air conditioning and ventilation applications are described in the German patent publication 9,218,021.3 (utility model) or also the European patent publication 0 687 195. Here a fine filter layer of meltblown micro-fiber non-woven material, which determines the degree of separation, is covered with a coarse filter layer on the inlet side so that the dust holding capacity is boosted. The disadvantage is here that for a pleatable design a third layer is generally necessary, which provides the mechanical strength (more particularly stiffness) so that the pleated structure is self-supporting.

It is in the special case of cab air filtration for motor vehicles that melt blown non-woven materials are utilized as fine filters, whereas on the inlet side coarser structures, for example paper or spun non-woven material, serve as dust holding means.

The principle of melt blowing is described by Wente, Van A. in the article "Superfine Thermoplastic Fibers" in Industrial Engineering Chemistry, Vol. 48, pages 1342–1346. In gas or, respectively, air filtration generally such meltblown layers serve—owing to the fine fibers with a diameter or normally somewhat under 1 $\mu$m to 10 $\mu$m and owing to the frequently applied electret charge—as high efficiency separating filter layers and are for example described in the European patent publication 0 687 195, the German patent publication 9,218,021 (utility model) or the German patent publication 19,618,758, the fine meltblown layer always being employed of the outlet side (as a second filter layer). The support materials on the inlet flow side serve as dust storage means in the sense of deep filtration, the meltblown layer serves as a second filter stage in the sense of a fine dust filter. If a dust test is performed with the inlet flow on the "wrong side" that is to say with the meltblown side upstream, the initial degree of separation will be more or less identical, but the dust particle storage capacity goes down, i.e. an undesired filter cake is formed which increases the pressure loss on the inlet side with the meltblown layer surface.

The German patent publication 4,443,158 describes such a structure with the meltblown layer of the inlet side, the extremely high separating power of the meltblown material leading to a high degree of surface filtration, while the support material performs a purely mechanical function. The aim is however clear, i.e. to attain a good cleaning characteristic using for example compressed air after reaching the final differential pressure, but neither a high dust holding capacity during exposure to dust nor deep filtration. The meltblown layer here means an extremely high increase in the degree of separation, but simultaneously a reduction in service life in comparison with the second layer with extremely open pores.

One object of the invention is to provide a filter medium and an air filter with which the dust the holding capacity may be increased without any substantial change in the degree of separation and without any great increase in the thickness of the filter medium.

DETAILED DESCRIPTION OF THE INVENTION

Figure 1:
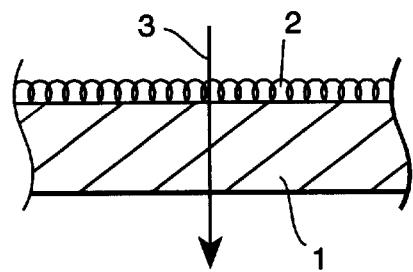
FIG. 1 shows a cross section taken through a first embodiment of the filter medium of the invention having two plies or layers.

In accordance with the invention at least one meltblown layer is located on the inlet side of the filter medium, whose pore size is larger than that of the following layer(s).

In experiments on meltblown non-woven material—normally with extremely fine fibers (with a diameter of under 1–10 $\mu$m)—it was surprisingly found that with the meltblown process also extremely coarse, open, i.e. fluffy meltblown non-woven material may be produced, which in the case of use on the inlet side of a classical filter paper substantially increase service life, namely by approximately 30 to over 300%, dependent on the particular design. In this respect it is less a question of the meltblown non-woven material performing a true filtering function than of the formation of a filter cake on the inlet side of the paper, which embeds itself in the meltblown layer, assumes a substantially looser structure and hence causes less pressure loss. It is an advantage to select for this purpose a fiber diameter of over 10 $\mu$m or even over 15 $\mu$m, in which respect—dependently of the polymer employed—at least partly fiber bands of 2 to 7 parallel fibers are formed, which are aligned in a single plane.

In this respect it is significant that for the first time the meliblown material—unlike state of the art materials—is responsible for the dust holding capacity as an extremely open structure on the inlet side, whereas the paper on the outlet or downstream side ensures the degree of separation in the normal fashion. This dual-ply combination possesses only a slightly higher degree of separation than paper by itself, while possessing the desired very much longer service life. The change in the degree of separation varies, in accordance with the method of testing, only within a range between 0 and 1% with a maximum up to 2% as determined gravimetrically.

The coarse structures in accordance with the invention are able to be obtained using customary polymers as for example polyethylene (PE) or polypropylene (PP). Owing to the higher thermal stability however polyphenylene sulfide (PPS), polybutylene terephthalate (PBT), polyethylene terephthalate (PET) and polycarbonate (PC) or blends thereof are preferred. In the case of the production of correspondingly coarse, fluffy structures, which possess the desired dust capacity, in the meltblown process particular importance is attached to the combination of the melt flow index (MFI) of the polymer and the variations in process temperature.

The effect of meltblown materials on the inlet or upstream side as a factor greatly increasing service life, only becomes apparent, when the meltblown structure is suitably coarse or, respectively, open. It has been found that layers—dependent on surface mass—with a permeability to air (at 200 Pa) under approximately 2000 l/m$^2$s tend rather to reduce the service life than increase it (however with a considerable increase in the degree of separation) Preferably the pore size of the meltblown layer amounts to more than 100 $\mu$m and more especially more than 250 $\mu$m. It is particularly preferred to utilize air permeabilities of more than 5000 l/m$^2$s (at 200 Pa) as related to the preferred area mass range of 15 through 35 g/m2. For particularly economic designs it is however possible to reduce the area mass to approximately 10 g/m$^2$ or for a particularly high dust holding capacity at high inlet velocities to increase it up up to 100 g/m$^2$. In the case of an excessively low area mass (under 10–15 g/m$^2$) the meltblown material does however lead to a heavy reduction in dust holding capacity and at extremely high area masse (over 50–100 g/m$^2$) costs increase in a disproportionate manner having regard to the technical effect produced.

As a second filter layer, which in the case of meltblown material on the raw gas side then corresponds to the second filter stage or, respectively, is responsible for any substantial degree of separation in the overall system, any known filter material may be employed: crimped non-woven material, wet-laid non-woven material, spun non-woven material, meltblown non-woven material, paper of pure cellulose or with a fraction of plastic fiber, which may be suitably impregnated, and the like. In order to obtain further deep filtration it is also possible for this second filter layer to have a gradient in it or even to be formed in two or more layers so that the filter medium in accordance with the invention in all may be not only dual- but triple- or multi-layer.

In the course of processing it may in some cases be possible to pleat the superposed layers without special joining means or additional connecting methods. Since the processes may vary in accordance with the particular processor selected, it is convenient to connect the individual layers together so that during pleating there is no displacement of the layers. Joining together of the individual layers is performed employing conventional technology, as for instance ultrasonic welding, thermal welding, spray-on adhesive or with a application of adhesive at points arranged in a grid or along strips, ultrasonic welding having turned out to be particularly advantageous, because the wadding-like structure of the meltblown pre-filter material is strengthened and solidified simultaneously without the welding operation on the contrary having an undue effect of the fluffiness of the material.

Owing to the firm connection of the pre-filter layer of meltblown material with the further layer(s) there is the production advantage that such a composite may be processed in the pleating machine like any standard paper without adaptation of the pleating machine itself. Furthermore sealing off the ends of the folds on the clean gas side may be take place in manner with a hotmelt seam or ridge.

Owing to the small increase in thickness and of the fluffiness of the pre-filter layer it is possible to work using only a minimum increase in fold spacing (maximum approximately 10–15%) that is to say, the number of folds per filter element may remain the same (or is reduced by merely 10–15%) and the increased specific dust holding capacity of the medium in accordance with the invention can be fully taken advantage of in the filter element. As an alternative in the filter element it is possible for the increased dust holding capacity to be employed to so considerably reduce the number of folds that the filter element will have the same dust holding capacity as on using a standard medium. The advantage is in this case that with the said fold spacing or pitch the filter element is substantially reduced in size and the requirements of the automotive industry for reduction in space to accommodate the filter may be complied with.

The invention will now be described in detail with reference to the accompanying drawings.

The first embodiment of the filter medium illustrated in FIG. 1 in accordance with the invention comprises a conventional filter paper 1, on which a meltblown layer 2 is placed of the inlet or upstream side. The direction of flow through the filter medium is indicated by an arrow 3. The meltblown layer 2 accordingly constitutes a pre-filter layer. Furthermore, the pore size of the meltblown layer 2 is larger than with of the filter paper 1 and preferably larger than 250 mm.

The meltblown layer 2 is only laid on the filter paper 1 and holds itself in place by a hooking action of the meltblown layer, which is normally in the form of a non-woven material, on the filter paper. Special connecting means between the filter paper 1 and the meltblown layer 2, as for example adhesives or additional bonding methods, are hence unnecessary.

Figure 2:
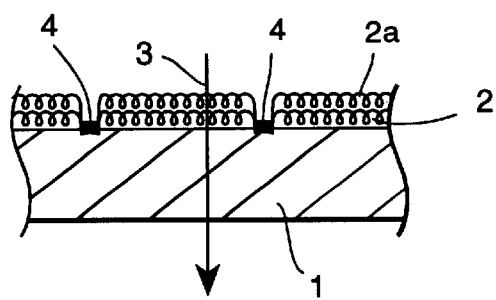
FIG. 2 is a cross section taken a second embodiment of the filter medium of the invention with three layers.

In FIG. 2 the reader will see a second embodiment of the filter medium in accordance with the invention, in the case of which two superposed meltblown layers 2 and 2a are placed on the filter paper 1 on the inlet or upstream side. Both meltblown layers 2 and 2a again serve as a coarse-pored pre-filter. Furthermore the two meltblown layers 2 and 2a are joined by means of ultrasonic welding in a grid formation with the filter paper. The weld spots are referenced 4.

Figure 3:
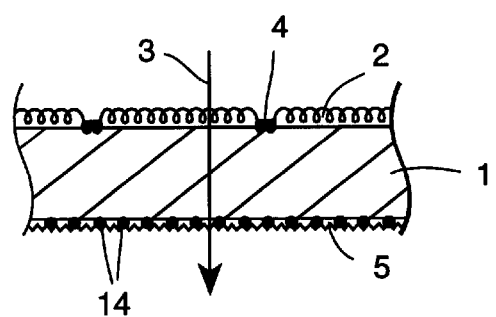
FIG. 3 is a cross section taken a third embodiment of the filter medium of the invention with three layers.

FIG. 3 shows a third embodiment of the filter medium in accordance with the invention, which is also designed in three layers. An extremely coarse meltblown layer 2, which is applied to the filter paper 1, again serves as a pre-filter. The filter paper 1 relatively open pored in this embodiment in order to achieve a long service life. In order to simultaneously ensure that a correspondingly high degree of separation is achieved, as a third layer a state of the art fine-fiber meltblown layer 5 is employed, which is applied to the other, opposite side of the filter paper 1, i.e. on the downstream side. The bond between the upstream coarse meltblown layer 2 and the filter paper 1 is produced by ultrasonic welding, as is indicated by the weld spots 4. The fine-fiber meltblown layer 5 is laminated by spraying on adhesive, as is indicated by the drops 14 of adhesive. Generally speaking there is a three-stage gradient filter.

Figure 4:
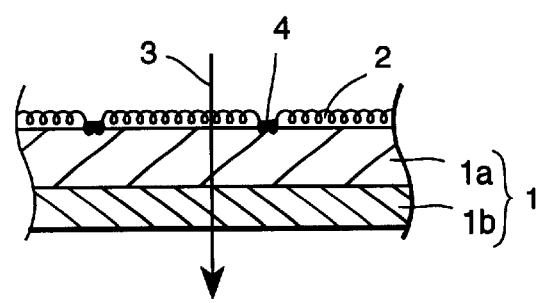
FIG. 4 is a cross section taken a fourth embodiment of the filter medium of the invention with three layers.

FIG. 4 shows a fourth embodiment of the filter medium in accordance with the invention. Again a coarse meltblown layer 2 is applied to the filter paper and again secured to it by ultrasonic welding.

The filter paper 1 is in the case of this embodiment made in two layers as a gradient filter and possesses two filter paper layers or plies 1a and 1b. The filter paper layer 1a, which is adjacent to the meltblown layer 2, and is located on that side which is first impinged by the flow, is owing to the selection of a suitable fiber mixture made coarser than the second filter paper layer, which has a greater separating effect. This means that there is again a three stage gradient filter.

Figure 5:
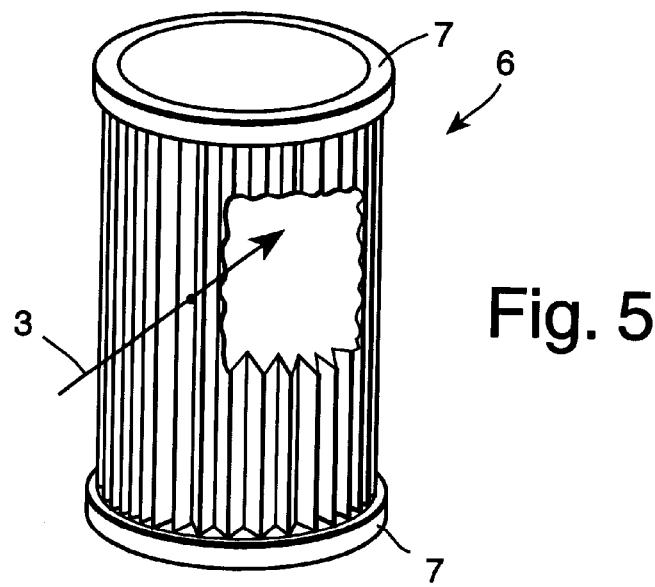
FIG. 5 represents a perspective view of a star-folded filter element, which uses the filter medium of the invention.

FIG. 5 shows a star folded filter element 6, which is made up of a filter medium in accordance with the working examples of FIG. 1 through 4. The filter medium is here introduced as an zig-zag folded array and the end faces are sealed off using end caps 7 and a casting composition as for example polyurethane (PU) or Plastisol not shown in detail. The coarse pored meltblown layer 2a and 2b in accordance with the invention is located on the outlet side, the filter element 6 having the flow passing through it from the inside to the outside. If the direction of flow is reversed, i.e. from the outside inward, the filter medium is so arranged that the coarse pore meltblown layer 2a and 2b is on the inner side.

Figure 6:
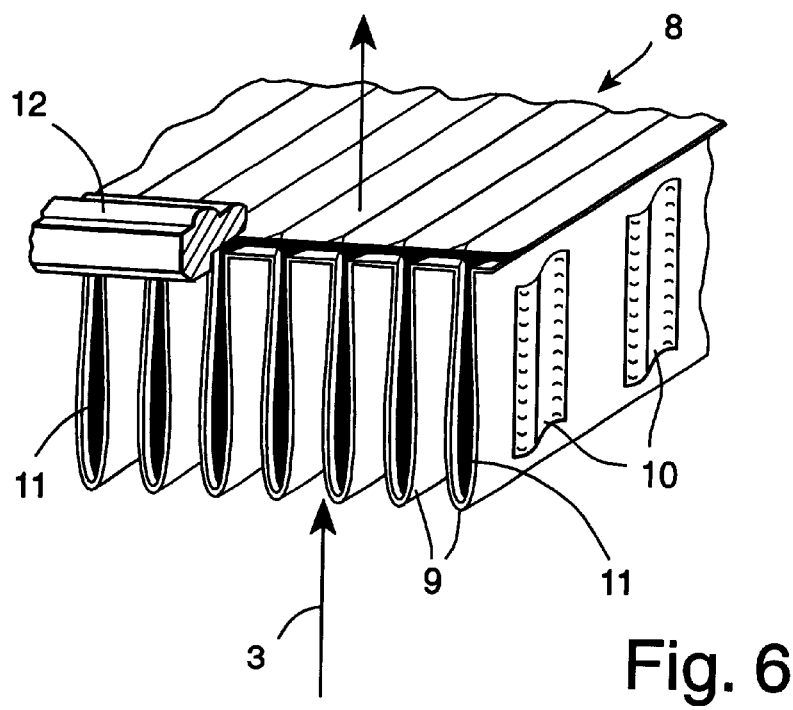
FIG. 6 is a perspective view of part of a further embodiment of the filter element in accordance with the invention in the form of a flat panel filter.]

FIG. 6 shows a flat filter element 8 in the form of a panel filter, that also has the filter medium illustrated in FIGS. 1 through 4 and is more particularly employed in the motor vehicle field. The smooth filter material is impressed with a suitable artistic design before formation of the folds 9. This results in the formation of zones 10 with embossed knobs or protuberances, by which the folded flanks are held equal distances apart. Between the opposite knobbed zones 10 in contact with each other filter pockets are formed, which ensure satisfactory input and output flow of the air into and out of the filter element 8.

Prior to the formation of the folds 9 a hotmelt seam or bead is applied to the clean gas side of the filter medium in order to provide a end seal 11 at the eventual end of the filter element. After formation of the folds 9 the folds 9 are sealed off at the end by the hotmelt layers in contact with one another. The remaining hotmelt material disappears at the peaks of the folds under a PU seal 12, which is applied later and serves to ensure that the filter element may later be mounted in the housing free of leaks.

The coarse meltblown layer 2 in accordance with the invention is located in this embodiment on the lower side of the filter element, which constitutes the inlet or upstream side, as is indicated by the arrow 3. The hotmelt adhesive bond on the top side of the filter element (clean gas side) is not interfered with by this

WORKING EXAMPLES

For the filtration of input air for internal combustion engines (diesel and gasoline engines for private cars and for diesel truck engines) different filter papers are necessary with an air permeability (measured at 200 Pa) of approximately to just over 1000 $l/m^2s$, the pore sizes (many pores detected using the "Bubble Test" of Dr. Kufferath and ethanol) extend from approximately 35 to approximately 100 $\mu$m. This spectrum is represented with two sorts of paper:

|  | Permeability to air at 200 PA in $l/m^2s$ | Many pores in $\mu$m |
| --- | --- | --- |
| Filter paper No. 1 | 860 | 75 |
| Filter paper No. 2 | 260 | 45 |

As test dusts those usually employed in accordance with SAE coarse and SAE fine are used as standards, although others are not excluded. The impingement velocities for the simulation of different element designs were set at 6.5 cm/s and 11 cm/s. The end of dust testing is defined as a final pressure loss of 3000 Pa. Other methods prescribe an increase in pressure loss, for example, during dust testing of 2000 or 2500 Pa. The service life corresponds to that quantity of dust which may be applied per $m^2$ of filtration area under these lab test conditions to the filter medium.

The comparison in pairs of filter paper on the one hand (reference) with filter paper plus meltblown on the other hand provides information about the increase in service life. Degrees of separation are not determined in this case, because the degree of separation is only slightly changed by the layer of meltblown. Dependent on the particular test method this will be typically 0—max 1%, for example, as determined gravimetrically, something which may also be confirmed since the pore size (many pores) and the air permeability is only changed within the limits of measurement (or is within natural variations) by the combination with a meltblown in accordance with the invention as compared with the pure papers, which is in any case inherent in the filter paper. It is for this reason that in the following these data will not be specified in more detail.

The filter paper No. 1 of the SAE coarse type has a dust holding capacity at 6.5 cm/s of 641 g/m$^2$. Owing to the combination with a meltblown layer on the inlet side we have.

| Polymer | Area mass in g/m$^2$s | Air permeability in l/m$^2$s at 200 Pa | Dust holding capacity in g/m$^2$ | Increase in length of service life over reference (%) |
|---|---|---|---|---|
| PP | 18 | 5200 | 2214 | +245 |
| PBT | 25 | 10500 | 949 | +48 |
| PC | 25 | 5000 | 1987 | +210 |

In comparison with this in the case of the meltblowns not of the invention (for example in accordance with German patent publication 4,443,153) we have:

| Polymer | Area mass in g/m$^2$s | Air permeability in l/m$^2$s at 200 Pa | Dust holding capacity in g/m$^2$ | Increase in length of service life over reference (%) |
|---|---|---|---|---|
| PP | 40 | 400 | 543 | −15 |
| PP | 30 | 700 | 592 | −8 |

An increase in the inlet flow to 11 cm/s leads to a dust holding capacity of 346 g/m$^2$ with the filter paper No. 1 in combination with the meltblowns in accordance with the invention as follows:

| Polymer | Area mass in g/m$^2$s | Air permeability in l/m$^2$s at 200 Pa | Dust holding capacity in g/m$^2$ | Increase in length of service life over reference (%) |
|---|---|---|---|---|
| PBT | 25 | 10500 | 641 | +85 |
| PC | 25 | 7200 | 1234 | +256 |

Once again combined with meltblowns not in accordance with the invention we then have:

| Polymer | Area mass in g/m$^2$s | Air permeability in l/m$^2$s at 200 Pa | Dust holding capacity in g/m$^2$ | Increase in length of service life over reference (%) |
|---|---|---|---|---|
| PP | 40 | 400 | 285 | −18 |

The filter paper No. 2, which owing to its denser structure leads to a greater pressure loss, possesses a dust holding capacity of 519 g/m$^2$ at 6.5 cm/s in a combination in accordance with the invention:

| Polymer | Area mass in g/m$^2$s | Air permeability in l/m$^2$s at 200 Pa | Dust holding capacity in g/m$^2$ | Increase in length of service life over reference (%) |
|---|---|---|---|---|
| PP | 18 | 5200 | 1993 | +284 |
| PBT | 20 | 10000 | 849 | +64 |
| BPT | 20 | 11000 | 890 | +72 |
| BPT | 30 | 8400 | 885 | +71 |
| BPT | 30 | 10000 | 966 | +86 |
| BPT | 40 | 7800 | 915 | +77 |
| BPT | 50 | 8600 | 1087 | +110 |
| PBT | 2 × 20 | 5500 | 1305 | +152 (total of 3 layers) |
| PBT | 5 × 20 | 2200 | 2243 | +332 (total of 6 layers) |
| PC | 25 | 5000 | 1175 | +127 |
| PC 25 | 25 | 7200 | 1480 | +185 |

Triple layer filter designs with a PP grid structure between the filter paper and the meltblown layer lead to the following results:

| Polymer | Area mass in g/m$^2$s | Air permeability in l/m$^2$s at 200 Pa | Dust holding capacity in g/m$^2$ | Increase in length of service life over reference (%) |
|---|---|---|---|---|
| PBT | 20 | 11000 | 1111 | +114 |
| PBT | 40 | 10000 | 1452 | +180 |

In the case of a high inlet flow velocity of 11 cm/s the dust holding capacity of filter paper No. 2 drops to 249 g/m$^2$ and in combination (according to the invention) with the meltblown we then have:

| Polymer | Area mass in g/m$^2$s | Air permeability in l/m$^2$s at 200 Pa | Dust holding capacity in g/m$^2$ | Increase in length of service life over reference (%) |
|---|---|---|---|---|
| PBT | 25 | 10500 | 493 | +98 |
| PC | 25 | 7200 | 783 | +214 |

In standard tests using SAE fine dust at 6.5 cm/s, for filter paper No. 1 the dust holding capacity is 256 g/m and with paper No. 2 of 243 g/m$^2$. Combined with meltblown (PP, 40 g/m$^2$, 400 l/g/m$^2$s) not in accordance with the invention, the dust holding capacity sinks between 200 and 210 g/m$^2$. With a suitably open structures the data for filter paper No. 1 are:

| Polymer | Area mass in g/m²s | Air permeability in l/m²s at 200 Pa | Dust holding capacity in g/m² | Increase in length of service life over reference (%) |
|---|---|---|---|---|
| PBT | 25 | 10500 | 374 | +46 |
| PC | 25 | 7200 | 555 | +117 | and in combination with filter paper No. 2:

| Polymer | Area mass in g/m²s | Air permeability in l/m²s at 200 Pa | Dust holding capacity in g/m² | Increase in length of service life over reference (%) |
|---|---|---|---|---|
| PBT | 20 | 11000 | 363 | +49 |
| PBT | 30 | 10000 | 431 | +78 |
| BPT | 20 | 10000 | 378 | +55 |
| BPT | 30 | 8400 | 450 | +85 |
| PC | 25 | 7200 | 470 | +93 |

In the case of the high inlet flow velocity of 11 cm/s and SAE fine test dust as well service life increases:

| Polymer | Area mass in g/m²s | Air permeability in l/m²s at 200 Pa | Dust holding capacity in g/m² | Increase in length of service life over reference (%) |
|---|---|---|---|---|
| Filter paper No. 1 | | | 188 | Reference |
| PP | 40 | 400 | 123 | −35, not in accordance with invention |
| PBT | 25 | 10000 | 293 | +56 |
| PC | 25 | 7200 | 449 | +139 |
| Filter paper No. 2 | | | 116 | Reference |
| PP | 40 | 400 | 113 | −3 not in accordance with invention |
| PC | 25 | 7200 | 243 | +110 |

What is claimed is:

1. A dual- or multi-layer filter medium for air filtration, which comprises at least one meltblown layer located on an inlet side of the filter medium and having a pore size larger than that of the following layer or layers, wherein the meltblown layer has a pore size of more than 100 $\mu$m, an area mass in a range between 10 and 100 g/m², a permeability to air (at 200 Pa) of over 2000 l/m²s and fibers having a diameter of over 10 $\mu$m.

2. The filter medium of claim 1, wherein the pore size of the meltblown layer is more than 250 $\mu$m.

3. The filter medium of claim 1, wherein the filter medium is pleatable.

4. The filter medium of claim 1, wherein at least one layer includes a filter paper increasing rigidity of the filter medium.

5. The filter medium of claim 1, wherein the filter medium includes at least one layer of a spun non-woven material, a crimped non-woven material or a wet-laid non-woven material increasing rigidity.

6. The filter medium of claim 4, wherein the filter paper is impregnated.

7. The filter medium of claim 1, wherein the meltblown layer includes fibers of polyphenylene sulfide (PPS), polycarbonate (PC), polyester, polyethylene (PE) or polypropylene (PP).

8. The filter medium of claim 7, wherein the polyester is polybutylene terephthalate (PBT).

9. The filter medium of claim 7, wherein the meltblown layer includes a mixture of said polymers.

10. The filter medium of claim 1, wherein the meltblown layer has an area mass of 15 to 35 g/m².

11. The filter medium of claim 1, wherein the meltblown layer has a permeability to air (at 200 Pa) of over 5000 l/m²s.

12. The filter medium of claim 1, wherein the meltblown layer is placed in position on a contiguous layer without any additional connecting means.

13. The filter medium of claim 1, wherein the meltblown layer is firmly bonded to a contiguous layer.

14. The filter medium of claim 13, wherein the meltblown layer is bonded by a grid or linear array of adhesive or by spraying on adhesive.

15. The filter medium of claim 13, wherein the bonding is produced by grid ultrasonic welding.

16. A filter element for air filtration comprising a filter medium of claim 1.

17. A dual- or multi-layer filter medium for air filtration, which comprises at least one meltblown layer located on an inlet side of the filter medium and having a pore size larger than that of the following layer or layers, wherein the meltblown layer has a pore size of more than 250 $\mu$m, an area mass in a range between 10 and 100 g/m², a permeability to air (at 200 Pa) of over 5000 l/m²s and fibers having a diameter of over 10 $\mu$m.

18. The filter element of claim 17, wherein the filter medium is pleated.

19. The filter element of claim 18, wherein the pleated filter medium is arranged in the form of flat panel filter.

20. The filter element of claim 17, wherein the pleated filter medium is arranged circularly as a star folded cartridge filter.

\* \* \* \* \*